March 30, 1954  W. B. RETZ  2,673,388
MEANS FOR PREVENTING DRAW BACK MARKS
Filed July 7, 1948  2 Sheets-Sheet 1
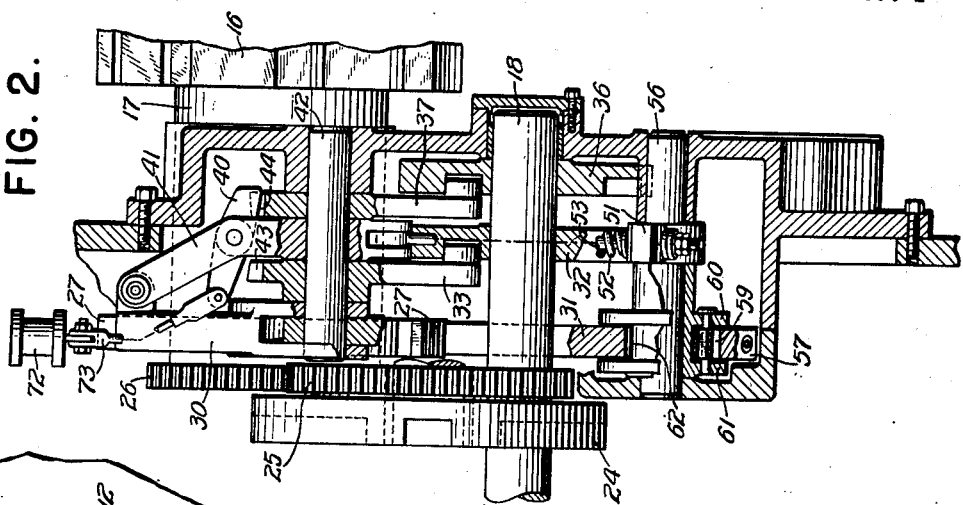
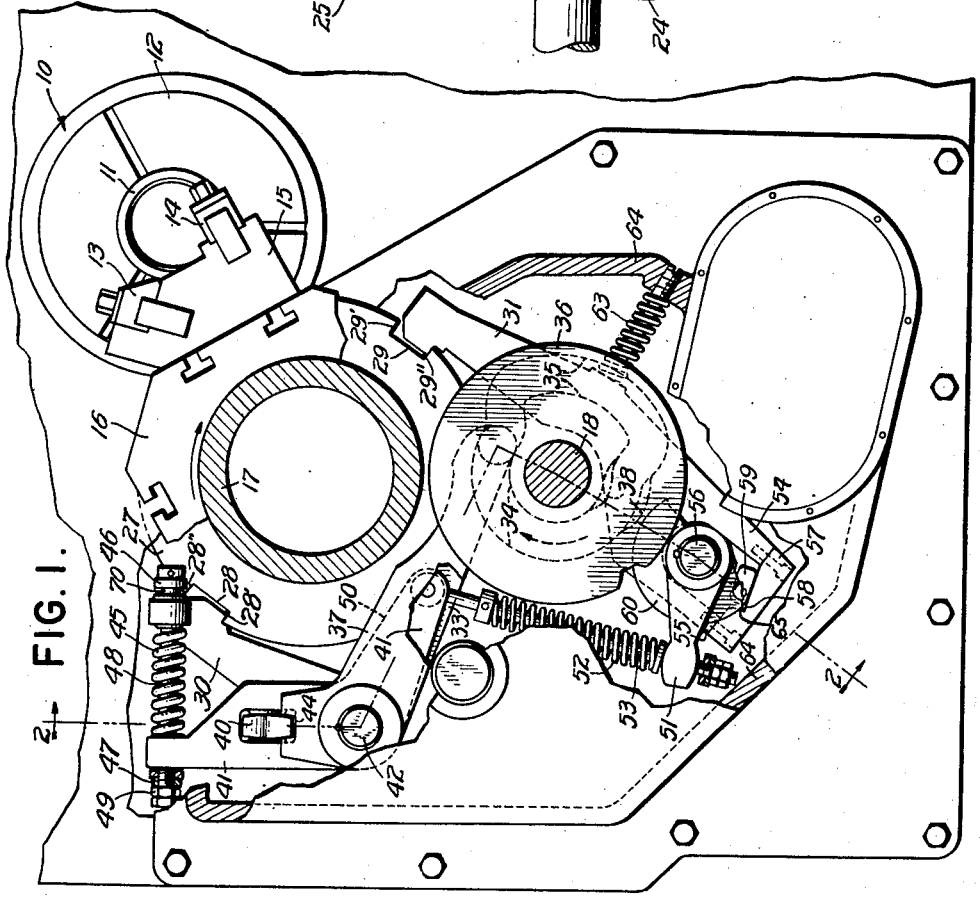
Inventor
WILLIAM B. RETZ
By  *Mitchell Burhert*
Attorneys March 30, 1954     W. B. RETZ     2,673,388
MEANS FOR PREVENTING DRAW BACK MARKS
Filed July 7, 1948     2 Sheets-Sheet 2

Inventor
WILLIAM B. RETZ
By
*Mitchum Bubut*
Attorneys

Patented Mar. 30, 1954

2,673,388

UNITED STATES PATENT OFFICE 2,673,388

MEANS FOR PREVENTING DRAW BACK MARKS

William B. Retz, Plainville, Conn., assignor to The New Britain Machine Company, New Britain, Conn., a corporation of Connecticut Application July 7, 1948, Serial No. 37,490

15 Claims. (Cl. 29—50)

My invention relates to means for preventing draw-back marks in a machine tool.

It is well known that in rotating machines, such as lathes, multiple-spindle bar and chucking machines and the like, so-called drag-off marks may be left on the work upon the completion of a cut and as the tool and the work are withdrawn or retracted relatively to each other. These drag-off marks may mar the finish and may make it necessary to perform an additional finishing operation in order to produce a clean appearance; alternatively, the drag-off marks may be avoided by a properly timed and coordinated commencement of indexing just prior to tool drawback, as disclosed in U. S. Patent 2,618,043 to Gustaf R. Carlson. However, in certain types of machines, as in turret lathes or the like, wherein a number of different tools are serially brought to bear upon a given piece of work, it may not always be desirable to produce the slight indexing movement at each indexed position, for such movement would, of course, be disastrous in the case of a drilling operation.

It is, accordingly, an object of the present invention to provide an improved means of the character indicated for avoiding drag-off marks.

It is another object to provide a machine of the character indicated wherein a mechanism for the avoidance of drag-off marks may be selectively rendered operative or inoperative as desired.

It is a further object to provide in an indexing machine of the character indicated a means for producing a slight back-index movement in order to provide a clearance between a tool and a piece of work during a retraction of the tool and the work relatively to each other.

It is still another object to provide an improved means for prolonging the life of carbide-tipped tools in a machine of the character indicated.

It is a specific object to provide in an indexing machine of the character indicated, a means for incrementally indexing said machine after a feed and prior to a withdrawal of a tool holder and a work holder relatively to each other, and means operating in timed relation with the indexing of said machine for selectively disabling the incremental indexing mechanism, whereby for one indexed position of said machine there may be a partial indexing and for another indexed position of said machine there may not be a partial indexing.

It is also an object to provide an improved locating and locking mechanism for positively holding an indexible part in its indexed positions in a machine of the character indicated.

Other objects and various further features of the invention will be pointed out or will occur to those skilled in the art from a reading of the following specification in conjunction with the accompanying drawings. In the drawings, which show, for illustrative purposes only a preferred form of the invention:

Fig. 1 is a fragmentary front-end view of a turret-type lathe, with parts broken away to show a mechanism incorporating features of the invention;

Fig. 2 is a more or less vertical sectional view taken through a number of centers connected by the line 2—2 of Fig. 1;

Figure 3:
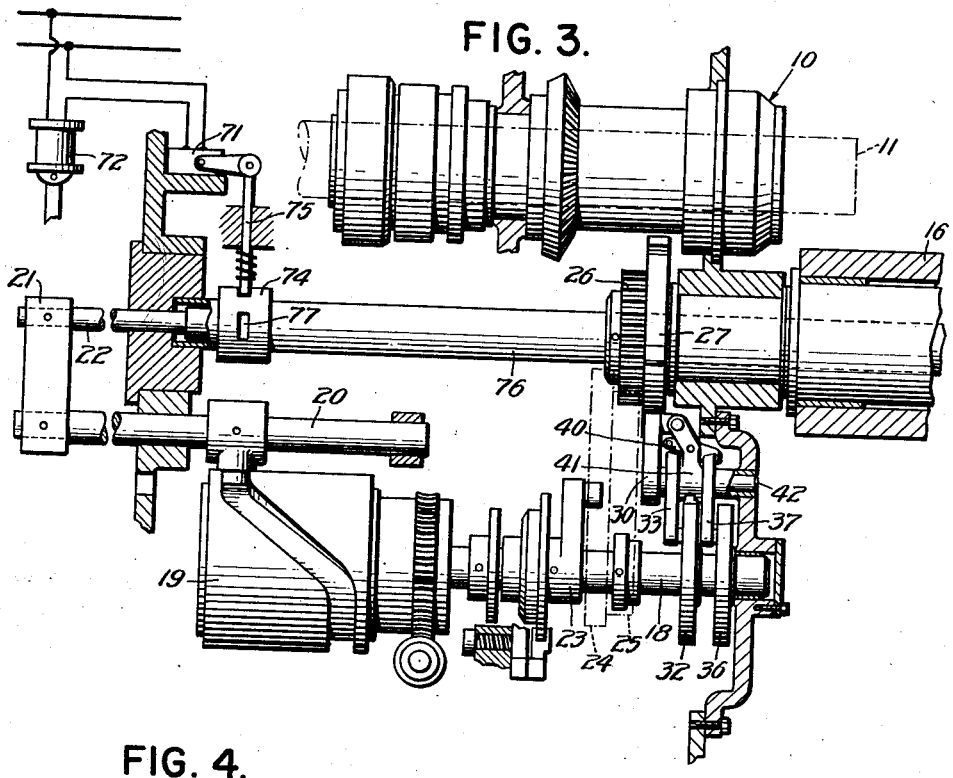
Fig. 3 is a schematic horizontal sectional view of parts of the machine of Fig. 1.

Briefly stated, my invention contemplates a machine in which a tool holder and a work holder are fed relatively to each other, and in which means are provided to stress one of the holders toward the other during a part of the feed cycle, the stress being relieved during another part of the feed cycle, whereby during such stress relief the holders may be sufficiently displaced relatively to each other to permit a tool to clear a piece of work. In the form to be described, there is indexible means for one of the holders, and the timed stressing is applied to the indexible means in such a way that, upon stress relief, there may be a partial indexing sufficient to produce the desired work clearance. Means operating in timed relation with the indexing of the indexible means is operative to select one or the other of two types of feed (normal or modified normal) depending upon the type of cutting operation that proceeds for the particular indexed position of the indexible means, whereby no drag-off marks need be made during turning or boring operations.

Referring to the drawings, my invention is shown in application to a turret lathe of the type disclosed in more complete detail in U. S. Patent 2,628,414 to Donald H. Montgomery. Such a machine includes a single spindle 10 which may revolubly support a piece of stock 11 in a collet, chuck, or the like 12. Tools, such as a turning tool 13 and a chamfering tool 14, may be supported by suitable tool-holder means 15 at one of a number of stations on a tool slide 16, which may be of the turret or indexible type. In the form shown, the turret or tool slide 16 has four indexible stations and is slidably mounted on an arbor 17 for feeding operations; these feeding operations may occur once for each indexed operation of the tool slide 16. Indexing, feeding, and other operations may be governed by a cam means in the form of a main camshaft 18, and a feed cam 19 (through cam-follower means including a first slidable rod 20 clamped at 21 to a second slidable rod 22) may impart feeding and retracting motion to the tool slide 16. Also shown on the main camshaft 18 is a Geneva arm 23 for engagement with a Geneva or star wheel 24, which may operate through a gear train 25—26 to index the arbor 17 and hence to the tool slide 16. To assist in locating and in holding the turret 16 in each of its indexed positions while a feed is in progress a suitable locating and locating plate 27 may be anchored to the arbor 17 and hence to the turret 16.

In a machine as thus far described, the use of a turning tool, such as the tool 13, may and in all probability will result in the formation of a so-called drag-off mark on the work 11 as the tool holder 15 is retracted away from the work. If the machine happens to be equipped with a high-speed tool, such as a carbide-tipped tool, the mere fact that the tool is in only slight contact with the work during the formation of the drag-off mark may result in excessive wear of the tool. Such wear is to be distinguished from the relatively slight wear which results from making a sufficiently heavy cut into the work 11 during the feed part of the cycle.

In accordance with a feature of the invention, I provide a means not only for avoiding the unnecessary production of drag-off marks with tools such as the tool 13 but also for avoiding such excessive wear in the tool 13 as may result from the constant repetition of light drag-off cuts. This means contemplates the timed stressing and stress-relief of the tool slide 16 relatively to the spindle or work-holder means 10 and in the form shown this stressing and stress-relief are utilized to effect a sufficient bodily indexing of the tool slide 16 to produce a clearance of the tools relatively to the work, in order to avoid dragging the work during the retraction process.

The desired partial indexing may be effected by employment of novel locking and locating means operating in conjunction with the plate 27. The plate 27 preferably includes abutment means identifiable with each indexed position of the indexible means 16 and positioned for interception by suitable members carried by the frame of the machine. The abutment means on the plate 27 may include each of the side walls of a number of grooves or slots 28—29 formed in the plate 27. For the machine shown, the indexing direction for the turret or indexible means 16 is clockwise in the sense of Fig. 1, as shown by the arrow; the slot walls 28' and 29' may then become locating abutments, and the slot walls 28" and 29" may be locking abutments.

For normal locating and locking I may employ a locating lever 30 and a locking lever 31 having fingers or ledges for suitable engagement with the appropriate sides of the slots 28—29, and their programmed operation may be determined by suitable cam means on the main camshaft 18. A locating and locking cam 32 may determine the motion of a follower lever 33 having a roll positioned in the slot of the cam 32. The program of the cam 32 may be such as to produce what may be termed a normal locating and locking operation; the cam 32 may comprise a prolonged low dwell 34 during which normal feed and retraction of the tool slide 16 may take place, and a shorter duration high dwell 35 during which indexing may take place.

For a purpose which will be clear, a second cam 36 generally similar to the cam 32 may also be mounted upon the main camshaft 18, and its program may determine the motion of a second cam-follower lever 37. However, unlike the cam 32, the second cam 36 preferably includes a slight rise 38 timed to occur just before and during the retraction of the tool slide 16 with respect to the work 11. The rise 38 may be of the order of one-third or one-half the total rise necessary to effect such freedom of the locating and locking levers 30—31 from the plate 27 as will permit the indexing operation to take place.

In accordance with a feature of the invention, I provide means for selectively employing the program from one or the other of the cam means 32—36 for appropriate operation of the locating and locking means 30—31, depending upon the type of cutting operation that is proceeding for a particular indexed position of the turret 16. For this purpose, I employ a dogging member or rocker arm 40 pivotally supported and carried by an arm 41. The arm 41 may be pivoted on a common shaft 42 with the cam follower arms 33—37 and may be located between arms 33—37. The dogging lever may be poised to engage one or the other of two dogging slots or other abutments 43—44 in the follower levers 33—37 so that, depending upon whether the dogging means 40 is engaged with the lever 33 or with the lever 37 (as shown), the crank or arm 41 may be caused to follow the program of cams 32 or 36 (as shown), respectively.

The locating lever 30 may be spring urged into locating engagement with the plate 27, and in the form shown this is accomplished by a resiliently opposed lost-motion connection between the crank or arm 41 and the locating lever 30. This connection may be effected by a compression spring 45 between the levers 30 and 41, and in order to effect positive retraction of the locating lever 30, as just before and during a substantial part of the indexing operation, the lost motion may be limited by means of a stop 46—47 on a pull rod 48 extending through the spring 45. If desired, adjustable lock-nut means 49 may be included at one end of the pull rod 48, for setting-up purposes.

The locking motion imparted to the lever 31 may be generally similar to that of the locating lever 30 and may also be controlled by the crank 41, which is shown to include a second arm 50 linked by a resiliently opposed lost-motion connection to a further crank 51, which may be pivoted in the frame of the machine. As in the case of the connection to locating lever 30, the connection to lever 51 may include a compression spring 52 and an adjustably lengthened pull rod 53.

In accordance with a feature of the invention there may be some lost motion or looseness in the normal fulcrum support for the locking lever 31, and in the form shown the lower part of the lever 31 includes two projecting legs 54—55 to span the rocking shaft 56 for the arm 51. The legs 54—55 of the locking lever 31 may be capped by a tail piece 57, suitably secured as by bolts to each of the legs 54—55. For a purpose which will be clear, the tail piece 57 is preferably formed with means stressingly to react with motion of the crank or arm 51, and in the form shown this reaction is such as to produce a downward stressing thrust or displacement of the locking lever 31 upon counterclockwise rotation (in the sense of Fig. 1) of the crank or arm 51. To effect such displacement the tail piece 57 may be formed with an inclined wedging surface 58 upon which a slide block 59 may ride, and in the form shown the block 59 is pivotally carried between two supporting members in the form of discs 60—61. The discs 60—61 may be separately keyed to the rocking shaft 56 or they may be formed, as shown, from one and the same piece having a deep circumferentially extending groove 62 to serve for the guiding support of the effective fulcrum of the locking lever 31. In order resiliently to urge the locking lever 31 normally against the plate 27, I have shown a compression spring 63 positioned between the frame or housing 64 and an intermediate part of the lever 31.

In a normal operation of my locating and locking means the dogging means 40 will be set for engagement with the slot 43 in the follower arm 33, and, therefore, the programming for the function of levers 30—31 will be determined by the cam 32. In such event, after a retraction of the tools from the work and just prior to an indexing of the tool slide 16, the cam follower 33 will strike the rise in cam 32 and thus produce a full and sudden counterclockwise displacement of the crank 41. This displacement is preferably sufficient not only to overcome the normal lost motion in the connections to lever 30 and to crank 51, but also positively to withdraw the crank 39 from the slot 28 and to displace the slide block 59 all the way down the inclined surface 58 and into thrusting abutment with a step 65 at the end of the inclined surface 58 and on the tail piece 57. The effect of such abutment will be understood to apply a positive turning moment to the locking lever 31 about the surface of the groove 62 as a fulcrum, thus positively retracting the locking lever 31 from engagement with the slot 29.

Both levers 30—31 may thus be held retracted during the full period of the high dwell 35 of cam 32, and this high dwell 35 perferably terminates prior to completion of the indexing process. It will be clear then that, upon return of the cam follower 33 to the low dwell 34, both locating and locking levers 30—31 may be resiliently urged to slide over the periphery of plate 27 so as to drop into the next slots 28—29 corresponding to the next indexed position of the tool slide 16. The substantial part of the drop of the cam follower 33 occurs preferably during the termination of the indexing operation, and it will be appreciated that both levers 30—31 may engage their appropriate slots in plate 27 before the cam follower 33 reaches the low dwell 34 in the cam program. Thus, there may be an additional lowering displacement of the cam follower 30—33 after the locking lever 31 has engaged the slot 29. This additional available displacement of the follower arm 33 will be understood to be useful in such additional cranking of the arm 51 that the slide block 59 will be forced to ride the inclined surface 58 and thus to drive the lever 31 bodily downward for a secure lock.

In the other selected operation of my mechanism, with the dogging arm 40 in the position shown in Fig. 2, that is, in engagement with the follower crank 37, it will be understood that the locating and locking mechanism may derive its programmed operation from the cam 36. As far as the setting of the locating lever 30 and the setting of the locking lever 31 against abutment slots in plate 27 are concerned, the functioning with respect to the program of cam 36 may be exactly the same as that which has been described for the cam 32. In accordance with a feature of the invention, however, the intermediate rise portion 38 of the cam 36 may be utilized to produce the desired stress-relief or slight indexing of the turret or tool slide 16 in order to avoid drag-off marks.

The initiation of the rise 38 preferably occurs in timed relation with the completion of the feeding advance for the tool slide 16 and just prior to initiation of the retraction of the tool slide 16. The extent of the rise 38, however, is preferably such as to produce sufficient movement of the tie rod 53 to overcome whatever lost motion there may be between its bottom stop and the arm 51, and also to displace the slide block 59 down the inclined surface 58 preferably as far as the abutment 65, but no further. This movement will be understood to have been obtained at the cost of displacing the crank 41, but it is preferred that this movement be unaccompanied by any actuating displacement of the locating arm 30. Thus, it is preferred that the lost motion in the connection between crank 41 and arm 30 be adjusted by the lock nuts 49 so that movement of crank 41 due to tracking the intermediate cam rise 38 will serve only to take up such adjusted lost motion as that shown at 70 in Fig. 1.

Figure 4:
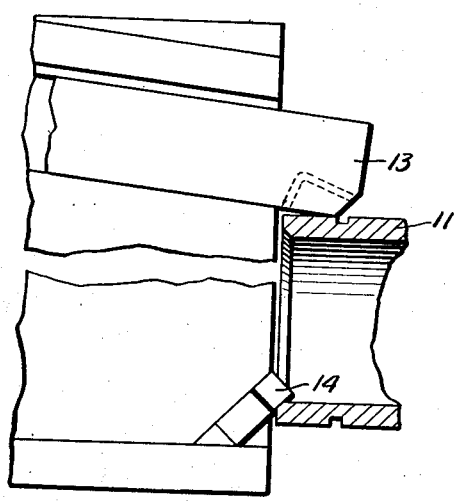
Figs. 4 and 5 are two similar enlarged fragmentary views showing two different relations of tools and the work in the machine of Fig. 1.
Figure 5:
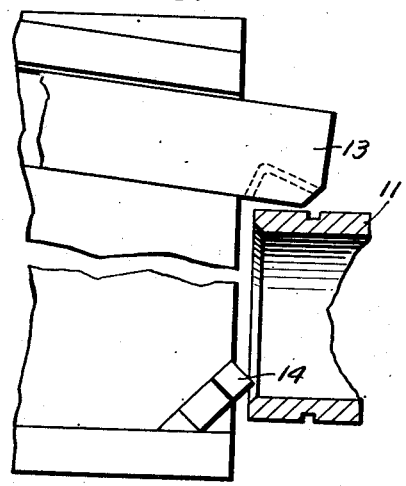

It will be appreciated that in producing a locking action under the camming influence of the slide block 59 the entire tool-slide arbor and certainly the locating plate 27 will have been abnormally stressed downwardly and to the left in the sense of Fig. 1. It will further be understood that upon a release only of such camming action (as timed by the intermediate rise 38 of the cam 36) this stress may be relieved on one side only (the locking side) of the plate 27. Since the locating lever is always positively identified with a fixed axis (shaft 42) in the frame of the machine, it will be clear that a result of such asymmetrical stress-relief may be to produce a slight effective back-indexing movement of the tool slide 16, and it is this movement which may be relied upon sufficiently to clear tools, such as the turning tool 13, from the work 11 to avoid the generation of a drag-off mark while withdrawing the tool from the work. The nature of this back-indexing movement may be appreciated by a comparison of Figs. 4 and 5, showing, with some exaggeration, the two tools 13—14 relative to the work 11, just before and just after the incremental index.

I have described a mechanism for avoiding a drag-off mark when a tool is employed that would normally cause such a mark. I have also described a more conventional operating mechanism which will firmly hold the tools and the work in correct alignment during the entire feed and retraction cycle, and this latter mechanism may clearly be most useful in the case of tools (such as drills) that normally do not produce drag-off marks. In accordance with a feature of the invention either of these mechanisms may be called into play in accordance with a given automatically controlled program, depending upon the tools to be employed at the various index positions of the machine. The automatic control may utilize electric switching means 71 in the form of a limit switch connected to operate a solenoid 72 linked, as by a connection 73, to the dogging lever 40. If desired, the programmed operation of the switch 71 may be governed by suitable cam means 74 and cam-follower means 75, the cam 74 being clamped to a member 76 that is indexible with the indexible means or tool slide 16. Flats, such as the flat 77, may be milled out of the cam 74 to coincide with the index stations at which it is desired that the solenoid 72 be operated and, hence, at the stations at which it is desired that the novel back-indexing movement of the invention be called into play. At other stations, at which it may not be desired to produce the back-indexing movement, there need be no such slots 77, and the switch 71 may, therefore, be open to permit the solenoid 72 to drop out and thus to dog the lever 40 for a more conventional operation of the machine.

It will be appreciated that I have described an ingenious mechanism for improving the quality of certain turning and the like operations and at the same time for substantially reducing the extent of tool wear. My mechanism will be understood to have wide application because of the readily adjusted flexibility with which the stress and stress-relief (incremental indexing) function may be called into play at one or more index stations, while a more conventional operation is retained for another index station in the same set-up of the machine. In the form that has been described, this selective indexing feature is achieved by employment of a novel locating and locking mechanism that may be equally effective regardless of the selected mode of indexing.

While I have described my invention in detail for the preferred form shown, it will be understood that modifications may be made within the scope of the invention as defined in the appended claims.

I claim:

1. In a machine of the character indicated, a work holder, a tool holder, feed means for feeding said holders relatively to each other, indexible means for one of said holders, locating means and locking means for said indexible means, first timing means operating in timed relation with said feed means for relieving said locking means a first interval prior to disablement of said locating means, second timing means operating in timed relation with said feed means for relieving said locking means a second interval prior to disablement of said locating means, and means selectively engageable with said timing means for selectively operating said locking means by said first timing means and by said second timing means.

2. A machine according to claim 1, and means responsive to an indexing of said indexible means and connected to said selectively engageable means, whereby said selectively engageable means may be operated in timed relation with an indexing of said indexible means.

3. In a machine of the character indicated, a tool holder, a work holder, feed means including cam means for feeding said holders relatively to each other, indexible means for one of said holders, locating means and locking means for said indexible means and connected for operation by said cam means, said cam means including a first cam engageable to relieve said locking means in a first timed relation with the cycle of said feed means, a second cam engageable to relieve said locking means in a second timed relation with the cycle of said feed means, and means for selectively engaging one or the other of said cams.

4. In a machine of the character indicated, indexible means including abutment means for locating and locking at each indexed station, a locating lever engageable with said abutment means, a locking lever engageable with said abutment means, means engageable with one of said levers and urging said one lever to rotate said indexible means into firm engagement with the other of said levers, first relieving means for said one lever, second relieving means for said other lever, and actuating means for said relieving means and connected to actuate said first relieving means before actuating said second relieving means.

5. A machine according to claim 4, in which said one lever is displaceably mounted for generally tangential displacement relatively to the axis of said indexible means, and in which cam means engage said one lever for displacing the same.

6. In a machine of the character indicated, a tool holder, a work holder, feed means for feeding said holders relatively to each other, indexible means for one of said holders and including locating and locking abutment means carried thereby, locating means for engagement with said abutment means, locking means for engagement with said abutment means, cam means operating in timed relation with said feed means and connected to one of said locating and locking means to stress said locking means and said locating means in opposition against said indexible means, said feed means including withdrawing means for withdrawing said holders relatively to each other, and means operative just prior to a withdrawal of said holders relatively to each other and connected to operate said cam means, whereby an operation of said cam means may be accompanied by such asymmetrical stress relief as to produce a partial indexing movement of said indexible means, for the purpose described.

7. In a machine of the character indicated, a frame, a tool holder, a work holder, feed means for one of said holders, indexible means for one of said holders and journalled in said frame, locating means carried by said frame and engageable with said indexible means, locking means engageable with said indexible means, cam means journalled in said frame and connected to said locking means for generally tangentially displaceably urging said locking means and hence said indexible means into clamped relation against said frame and against said locating means, and operating means for said cam means responsive to said feed means, whereby said cam means may be operated in timed relation with said feed means and may be effective to relieve said locking means before a drawback function of said feed means.

8. In a machine of the character indicated, a tool holder, a work holder, indexible means for one of said holders, feed means for feeding and withdrawing said holders relatively to each other, locating means engageable with said indexible means, locking means engageable with said indexible means, said feed means including a cam engageable to operate said locking means and said locating means in a first timed relation, a second cam engageable to operate said locating means and said locking means in a second timed relation, and timing means operating in timed relation with a full cycle of said indexible means and including means selectively engaging one or the other of said cams.

9. A machine according to claim 8, in which separate cam followers are in constant engagement with said cams and in which dogging means are selectively engageable with said cam followers for selectively operating said locating means and said locking means in accordance with the selected program of said timing means.

10. In a machine of the character indicated, a tool holder, a work holder, feed means for feeding said holders relatively to each other, indexing means for indexing said holders relative to each other in a given direction, further indexing means effective to produce a partial relative indexing of said holders in the opposite direction, and enabling means for said further indexing means and responsive to a particular indexed position of said first-mentioned indexing means, for the purpose described.

11. In a machine of the character indicated, a tool holder, a work holder, feed means for one of said holders, an indexible turret for one of said holders, indexing means for said turret, cam means for imparting a partial indexing movement to said turret, and enabling means for said cam means and responsive concurrently to said feed means and to a particular indexing of said indexing means, said enabling means including an indexible element connected for indexing with indexing movement of said turret, whereby said cam means may partially index said turret upon an operation of said feed means at a particular indexed position of said turret, for the purpose described.

12. In a machine of the character indicated, a tool holder, a work holder, indexible means for one of said holders and indexible about an indexing axis, feed means for feeding said holders relatively to each other, first holding means engaging one side of said indexible means against rotation in one direction, second holding means engaging a substantially diametrically opposite side of said indexible means against rotation in the opposite direction, one of said holding means being movable generally tangentially of said indexible means at the point of engagement therewith, cam means including a cam part and a cam-follower part, drive means for one of said parts and operating in timed relation with said feed means and with said indexible means, the other of said parts being in tangentially moving relation with said one holding means.

13. In a machine of the character indicated, a tool holder, a work holder, indexing means for one of said holders and indexible about an indexing axis, feed means for feeding said holders relatively to each other, holding means including spaced holders engageable with said indexing means at substantially oppositely spaced locations about the index axis thereof, and operating means for said holding means and including a clamping member acting on one of said holders in a tangentially moving direction with respect to the indexing axis and at the point of holding engagement of said one holder, said operating means including actuating means for said clamping member and operating in timed relation with said indexing means and with said feed means.

14. In a machine of the character indicated, a tool holder, a work holder, indexible means for one of said holders, feed means for feeding said holders relatively to each other, first holder means engageable with one side of said indexible means for holding the same against rotation, second holder means similarly engageable with another side of said indexible means, said second holder means including a holding member mounted for movement generally radially of and generally tangentially of the index axis, and actuating means for both said holder means and operating in timed relation with said feed means and with said indexible means, said last-defined means including a cam with a dwell intermediate first and second rises, said holding member being connected for substantially only tangential movement in response to one of said rises.

15. A machine according to claim 14, in which said holding member is connected for substantially only radial movement in response to the other of said rises.

WILLIAM B. RETZ.

References Cited in the file of this patent
UNITED STATES PATENTS

| Number | Name | Date |
|---|---|---|
| 635,853 | Henn | Oct. 31, 1899 |
| 1,511,447 | Drissner | Oct. 14, 1924 |
| 1,794,390 | Trobeck | Mar. 3, 1931 |
| 2,002,933 | Buell | May 28, 1935 |
| 2,453,120 | Curtis | Nov. 9, 1948 |
| 2,506,515 | Miller | May 2, 1950 |